(12) United States Patent
Swanson et al.

(10) Patent No.: US 7,068,861 B2
(45) Date of Patent: Jun. 27, 2006

(54) DEVICE AND METHOD FOR INSPECTING MARKINGS

(75) Inventors: Mark R. Swanson, Wisconsin Rapids, WI (US); William C. Apperson, Renton, WA (US); Donald K. Zahrte, Sr., Necedah, WI (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 656 days.

(21) Appl. No.: 09/946,797

(22) Filed: Sep. 4, 2001

(65) Prior Publication Data

US 2003/0044091 A1    Mar. 6, 2003

(51) Int. Cl.
*G06K 7/10* (2006.01)

(52) U.S. Cl. .................... 382/321; 382/312

(58) Field of Classification Search ............. 382/321, 382/312; 235/444, 453, 462.25, 494, 475, 235/462.44, 455, 375; 436/533; 356/155; 365/1; 705/10

See application file for complete search history.

(56) References Cited

U.S. PATENT DOCUMENTS

| | | | | |
|---|---|---|---|---|
| 3,684,864 A | * | 8/1972 | Call et al. ............... | 235/432 |
| 4,300,123 A | * | 11/1981 | McMillin et al. .......... | 235/436 |
| 5,144,116 A | * | 9/1992 | Harbers, Jr. ............. | 235/444 |
| 5,262,624 A | * | 11/1993 | Koch ..................... | 235/456 |
| 5,535,118 A | * | 7/1996 | Chumbley ............... | 235/375 |
| 5,610,387 A | * | 3/1997 | Bard et al. ............ | 235/462.44 |
| 5,664,030 A | * | 9/1997 | Iizuka .................. | 382/321 |
| 5,932,861 A | * | 8/1999 | Iwaguchi et al. .......... | 235/455 |
| 6,079,624 A | * | 6/2000 | Apperson et al. ......... | 235/494 |
| 6,176,429 B1 | * | 1/2001 | Reddersen et al. ..... | 235/462.25 |

\* cited by examiner

*Primary Examiner*—Anh Hong Do
(74) *Attorney, Agent, or Firm*—Merchant & Gould P.C.

(57) ABSTRACT

A device and method for reading optical marks are disclosed. The device, an optical mark reader (OMR) has an array of photo sensors with light-emitting diodes (LEDs), which are driven by digital-to-analog converters (DACs), which are in turn controlled by a microcontroller. When calibrating the OMR, the sensors read a white card, and the microcontroller adjust the DACs so that the outputs of all sensors are at a voltage close to the saturation points of the photo-transistors in the sensors so that the maximum useable ranges of the sensors are utilized. The sensors then read one or more patterns of known grayscales and their response voltages are recorded. The microcontroller generates an array of voltage values as a function of grayscale for each sensor and store the values in a memory device. When reading an optical marks, the sensor output voltage in response to a mark is looked up in the table of voltages values stored in the memory device to determine the grayscale of the mark. Various algorithms may be employed to calculate an apparent grayscale to allow the test taker's true intent be ascertained without requiring the test taker to make a perfect mark.

14 Claims, 12 Drawing Sheets

DEVICE AND METHOD FOR INSPECTING MARKINGS

FIELD OF THE INVENTION

The present invention relates generally to optoelectrically reading graphical patterns and more particularly to devices and methods for recognizing marks, such as "bubbles" filled in on examination answer sheets, of multiple shades of gray or various degrees of area coverage.

BACKGROUND OF THE INVENTION

Automated inspection and tallying of man-made markings have widespread applications. For example, in multiple-choice tests, each test taker may be instructed to indicate his or her answer to each question by darkening a delineated area, commonly called a "bubble", among a row of bubbles on an answer sheet or card ("bubble card" or "scan card"). A bubble card typically contains multiple rows of bubbles for multiple questions, with the bubbles also forming columns. The answer cards are then fed through an optical mark reader (OMR), which optoelectrically detects the location of the darkened bubble in each row, thereby determining the answer that the test taker chose. Similar techniques can also be used in conducting polls and elections.

Traditionally, stringent requirements have been imposed on the behavior of test takers, at least partially because traditional OMRs are not very tolerant of variations in how the bubbles are filled. For example, OMRs typically detect narrow infrared beams reflected from the bubbles and only distinguish between "black" and "white", i.e., bubbles that are darker or lighter than a particular threshold level. With such devices, the test taker typically must use one type of marker (e.g. number-2 pencil, but not pens, due to the differences in infrared absorption properties) and must fill in the bubbles completely.

Deviation from such requirements often results in misinterpretation of the test taker's intent. For example, incomplete coverage of a bubble may result in the bubble be recognized as a blank; erasures that leave smudges may be mistakenly recognized as filled bubbles. Additionally, because of such onerous requirements, test takers may become preoccupied with filling the bubbles correctly and less able to focus on the substantive tasks at hand. The answers, as recognized by the OMR, therefore may not accurately reflect the true level of the test takers' ability to answer the questions, but rather tend to include distortions caused by the mechanical difficulties of marking the answer sheets.

A traditional OMR typically employs an array light-emitting diodes (LEDs), which shine light on the multiple columns of bubbles on an answer sheet, and a corresponding array of photo detectors for detecting marks by measuring the light reflected from the bubbles. To ensure that similar marks in different columns will generate substantially similar responses among the detectors, prior art OMRs have employed components having closely matched characteristics, or individual potentiometers, manually adjusted at factory, for biasing each LED or detector. The manufacturing process for such OMRs is labor intensive. Such OMRs are also unsuited for recalibration in the field to accommodate changes in the characteristics of the components over time.

It is thus desirable to create an OMR is capable of correctly discerning test takers' intent from a wider variety of marks than the traditional OMRs and is more conveniently calibrated.

SUMMARY OF THE INVENTION

Generally, the invention provides an optical mark reader (OMR) device and method for detecting marks with varying degrees of apparent gray, or mark density. The invention also provides a method of automated calibration of the OMR that maximizes the responsive range of the optical sensors in an OMR.

According to one aspect of the invention, an optical mark reader includes: (a) a plurality of light sources, each configured and arranged to illuminate an area of a surface, the illuminated area having a reflectance; (b) a plurality of light detectors, each configured and arranged to receive at least a portion of any light reflected by the surface from a respective one of the plurality of light sources and output a signal indicative of the intensity of the received light; (c) a controller operatively connected to the plurality of detectors and configured and arranged to receive the signals output from the plurality of detectors; and (d) one or more power sources operatively connected to the plurality of light sources and operatively connected to the controller, and configured and arranged to supply power to the light sources in response to signals from the controller, wherein the controller is configured and arranged to generate, responsive to the output of each of the plurality of detectors, a signal indicative of the reflectance of the respective illuminated area.

The optical mark reader can further include a memory device operatively connected to the controller, wherein the controller is configured and arranged to read information from, and write information to, the memory device, wherein the memory device is encoded with calibration information, wherein the controller is configured and arranged to generate the signal indicative of the reflectance of the respective illuminated area in further response to the calibration information.

The controller in optical mark reader can be switchable to a calibration mode, in which mode the controller is configured and arranged to generate, responsive to the signals output from each of the plurality of detectors, a control signal that alters the power output of the power supply to the respective light emitter until the signal output from the detector reaches a predetermined level when the respective illuminated area has a first predetermined reflectance, and to store a code indicative of the final control signal in the memory device.

The controller can be configured and arranged to derive calibration information based at least partially on the signals output from each of the detector receiving reflected light from an area with a second predetermined reflectance, and encode the memory device with calibration information.

The plurality of light sources are light-emitting diodes and the power sources are configured and arranged to receive digital signals from the controller and supply power to the light-emitting diodes according to the digital signals received from the controller. The power sources for example can be digital-to-analog converters, with the analog side configured and arranged to power the light-emitting diodes, and the digital side configured and arranged to receive digital signals from the controller.

The optical mark reader can further include a computer interface module between the controller and a computer, wherein the controller is configured and arranged to transmit data to, and receive data from, the computer through the computer interface.

The controller can also include a memory area for storing program and is configured and arranged to receive programs from the computer through the computer interface.

According to one aspect of the invention, a method of calibrating an optical mark reader include: (a) illuminating a surface area having a predetermined reflectance using a light emitter of the optical mark reader; (b) receiving at least a portion of any light reflected by the surface area using a light detector of the optical mark reader; (c) measuring a signal generated by the light detector responsive to the received light; and (d) electronically adjusting the intensity of the illumination by the light emitter until the signal measured in step (c) becomes a predetermined value.

The adjustment in step (d) above can include supplying power to the light emitter using a power controller such a digital-to-analog converter that is configured and arranged to supply power to the light emitter in response to a digital signal and applying a variable digital signal applied to the power controller.

The method can further include: (e) illuminating a surface area of a second reflectance using the light emitter; (f) receiving at least a portion of the light reflected by the surface area from the light emitter; (g) generating a signal indicative of the intensity of the light received by the light receiver; and (h) calculating one or more calibration factors based on the signal.

In another aspect of the invention, a method of inspecting a bubble on a scan card includes (a) measuring the darkness of the surface within the bubble at a plurality of locations; (b) recording the peak darkness among the measurements; (c) calculating the average of all darkness measured at the plurality of locations; and (d) generating a signal as a function of the peak darkness and the average.

The signal-generating step can include generating a signal indicative of the peak darkness if the difference between the peak darkness and the average is smaller than a predetermined percentage of the peak darkness, and generating a signal indicative of the average if the difference is not smaller than the predetermined percentage.

BRIEF DESCRIPTION OF THE DRAWINGS

Other objects and advantages of the invention will become apparent upon reading the following detailed description and upon reference to the drawings in which:

FIGS. 1(*a*)–(*d*) show the various physical parts of an optical mark reader according to one aspect of the invention;

FIGS. 7(*a*)–(*c*) illustrates examples of marks that may be encountered by the OMR according to one aspect of the invention;

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Generally, the optical mark reader of the invention includes an array of optical sensors each having a light emitter (such as an LED) for shining light on a portion of a surface, and a light detector (such as a photo transistor or photo diode) positioned to receive at least a portion of the emitted light reflected by the surface. The OMR also includes one or more power sources (such as digital-to-analog converter (DAC)) for adjusting the intensities of light emitted by the light emitters. The OMR further includes a controller (such as a microcontroller) operatively connected to the power sources and configured to adjust the power output of the power sources. The OMR also includes a memory location for storing a set of calibration parameters for the optical sensors. The controller is configured to derive, from the signals generated by the light detectors and the calibration parameters, signals indicative of the reflectance of the portions of the surface illuminated by the light emitters.

In general, in calibrating the OMR of the invention, the optical sensors are first exposed to a surface of a first predetermined reflectance. The power sources for the light emitters are adjusted so that the output signals of the light detectors are set at a predetermined level. The settings of the power sources are stored in memory. At those settings, the optical sensors are exposed to a surface of at least a second predetermined reflectance. Areas of additional known levels of reflectance can be scanned. The calibration parameters signifying the correlation between each light detector's output and the corresponding reflectance are stored in the memory.

Using the OMR of the invention, one or more readings of the reflectance of a predetermined region (such as a bubble) of a surface (such as that of an answer sheet) is obtained. A predetermined algorithm is then applied to the readings to generate a signal indicative of the apparent reflectance of the region. Referring to FIGS. 1(*a*)–(*d*), mechanically, an OMR 100 according to an aspect of the invention includes a top portion 110 that can be snapped in a base 150, with a slot 140 in between to allow insertion and passage of a scan card through the OMR 100.

The top portion 110 includes a top cover 112 and bottom cover 120. They can be snapped together via the tabs 126 to house a circuit board 114, a stepper motor drive 118 and a computer interface cable 116. The circuit board has mounted thereon the circuitry, described in more detail below, including an array of optical sensors 130. In the illustrated embodiment, ten optical sensors 130A–J are shown, but any number of optical sensors can be used to suit particular applications. The circuit board 114 also has mounted thereon connectors 117 and 119 for detachably connecting the computer interface cable 116 and stepper motor drive 118, respectively, to the board 114. When the top potion 110 is assembled, the motor drive 118 is positioned in a cradle 122 formed in the bottom cover 120 such that a driver roller 156 protrudes through a slot 158 formed on the bottom cover 120. The circuit board 114 is positioned such at the array of optical sensors 130A–J is are directly over a window 124 in the bottom cover 120 for reading scan card passed under the window 124. A transparent, preferably scratch resistant, window cover 128 can be mounted, for example by an adhesive, over the window 124 to protect the optical sensors.

When the top portion 110 and base 150 are snapped together, a spring-loaded guide roller 154 is biased against the driver roller 156. When a scan card is placed between the driver roller 156 and guide roller 154 and the motor is energized, the motor 118 drives the driver roller 156 and guide roller 154 to move the scan card along a guide 152 formed in the base 150. The different rows of bubbles are thus positioned in turn under the optical sensors 130A–J to be read, as described below.

Numerous inventive features of the mechanical aspects of the OMR are described in detail in the co-pending and commonly owned U.S. Application, entitled "Optical Mark Reader" and filed on Sep. 4, 2001 Ser. No. 09/946,411. The aforementioned co-pending application is hereby incorporated herein by reference.

Figure 1A:
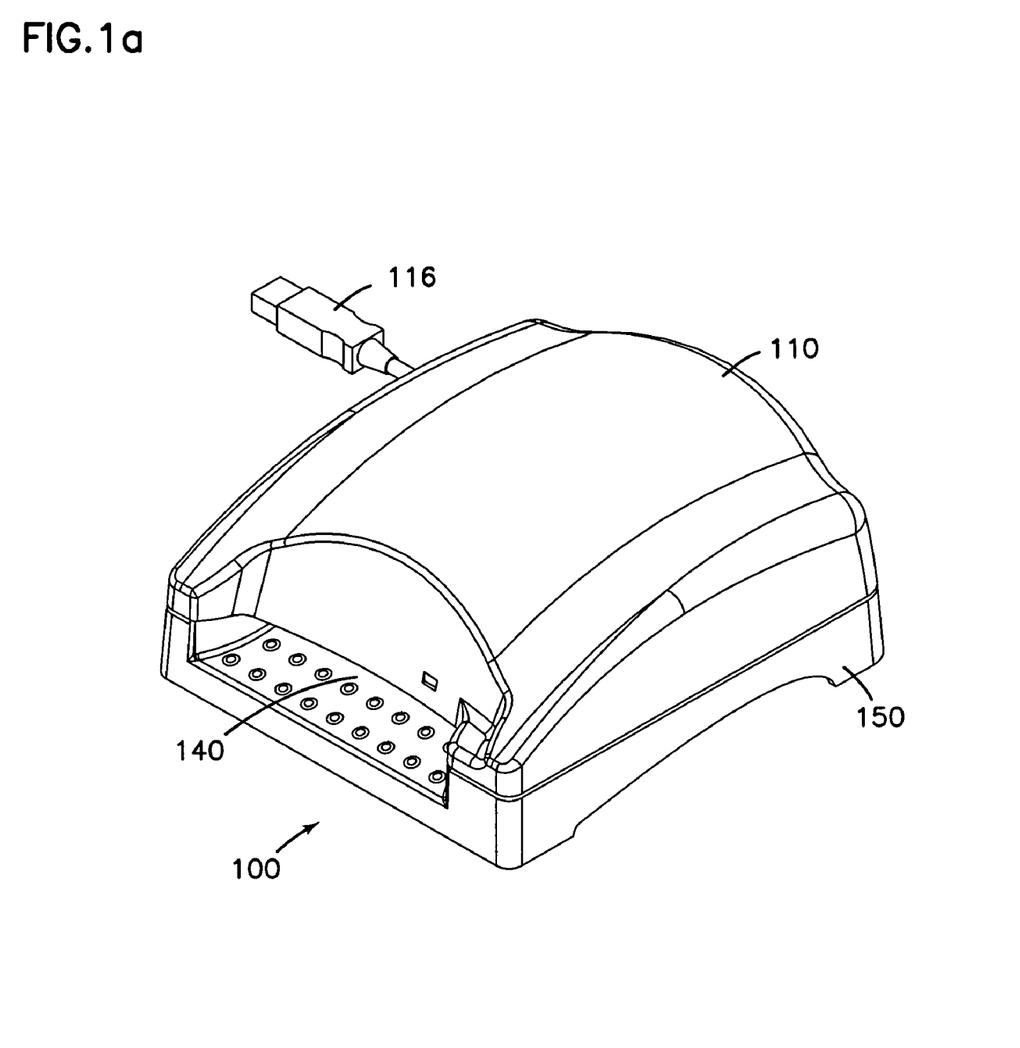
Figure 1B:
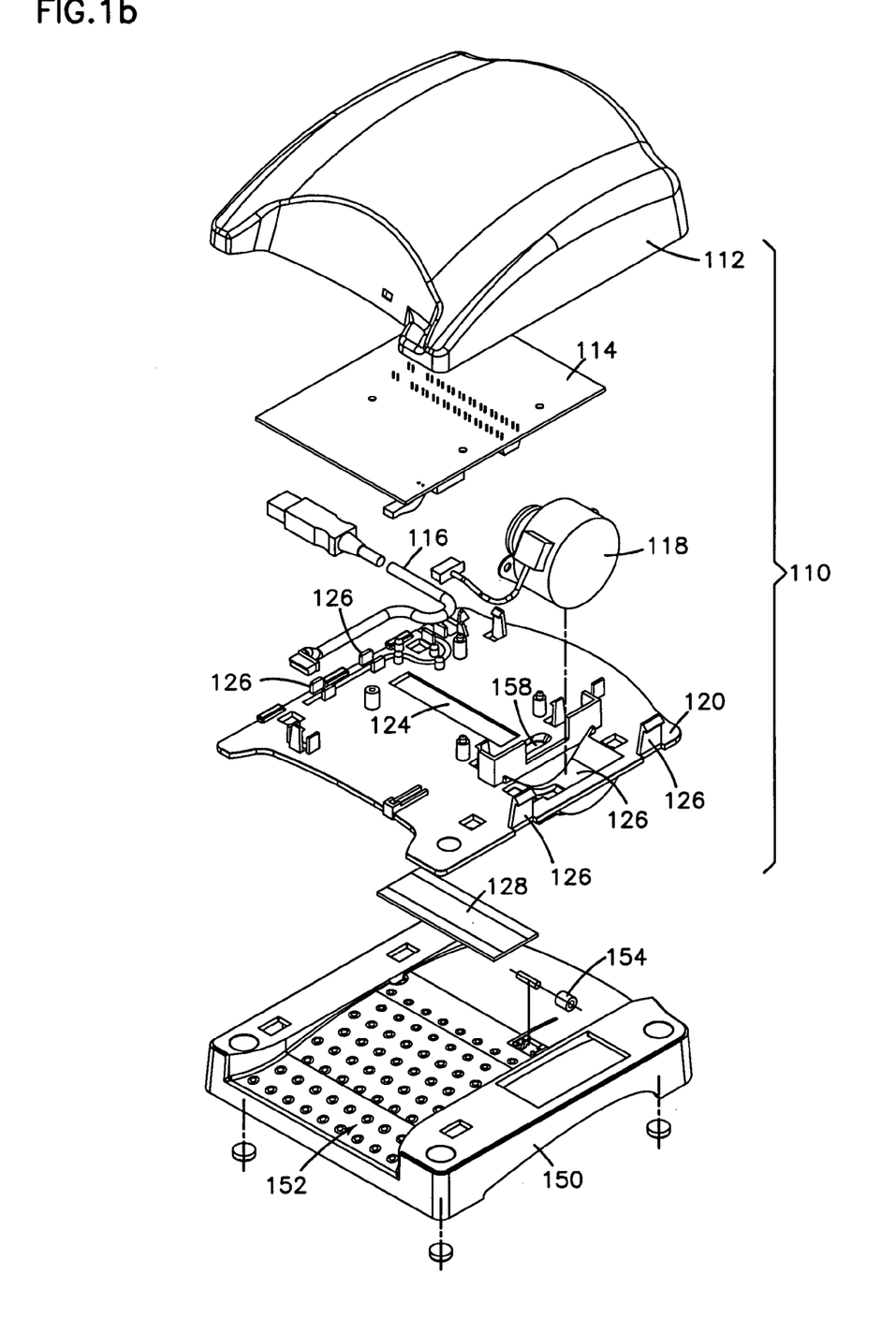
Figure 1C:
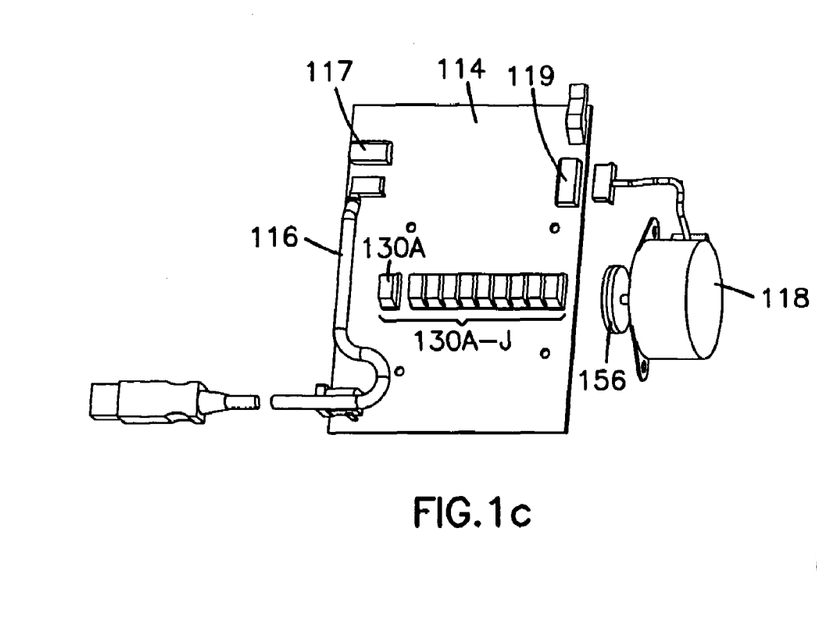
Figure 1D:
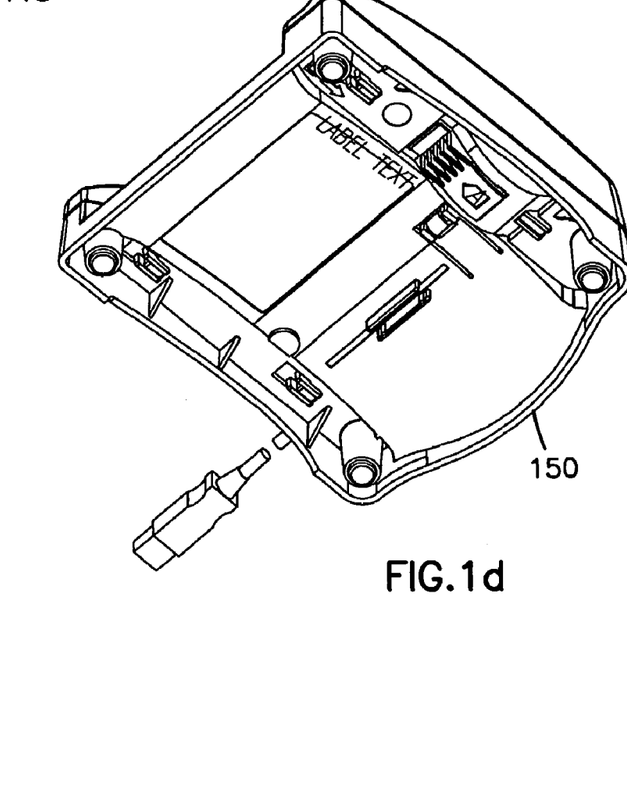
Figure 2:
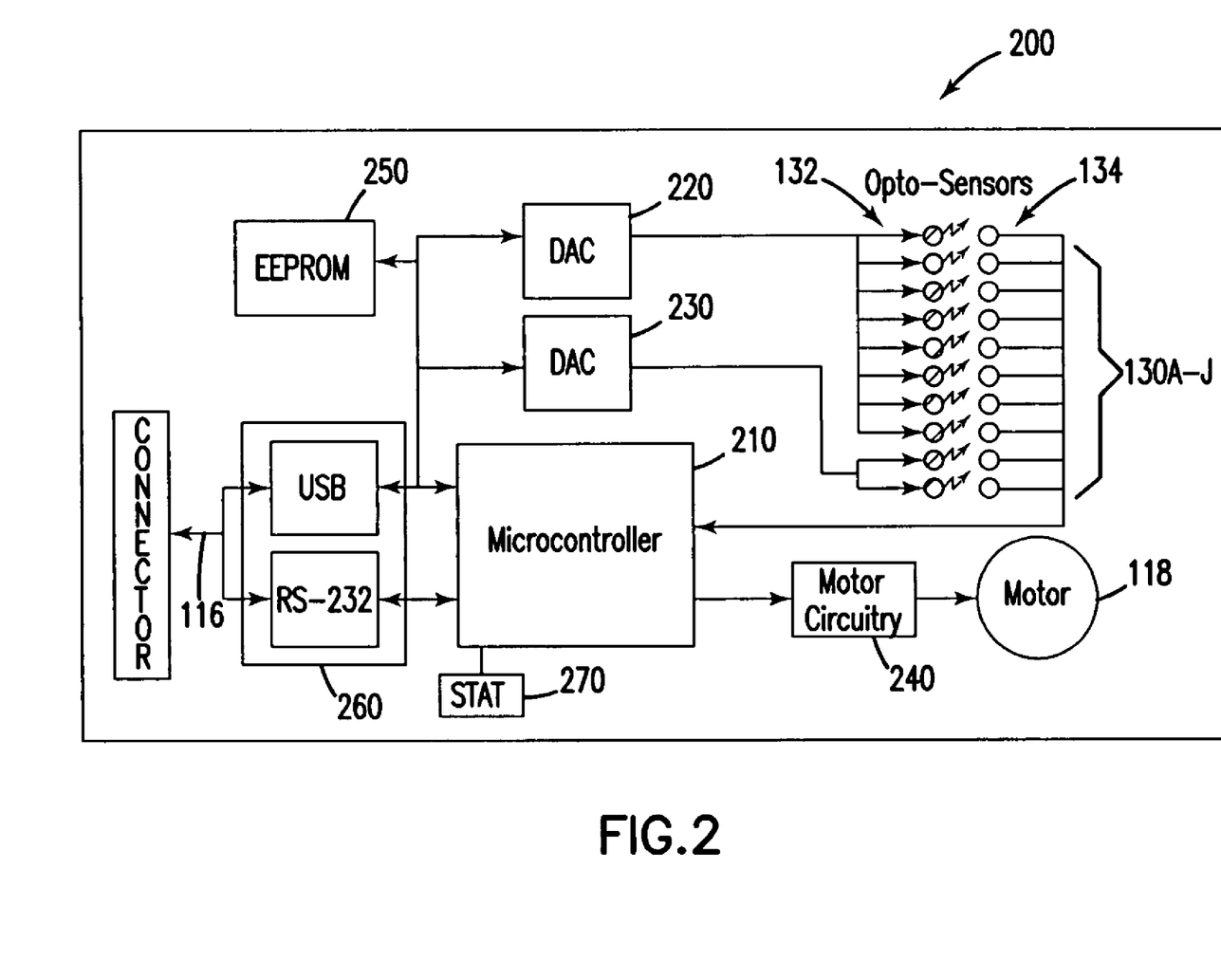
FIG. 2 shows, in block diagram form, an optical mark reader that is one embodiment of the invention.

Electronically, referring to FIG. 2, the circuitry 200 of the OMR 100 includes, as mentioned above, optical sensors 130A–J. The circuitry is controlled by a controller such as microcontroller 210, which is linked to one or more digital-to-analog converter (DAC) modules 220 and 230. Each DAC serves as a power sources, or driver, for one of the optical sensors 130A–J. More precisely, each optical sensor has a light-emitting side 132 and light detecting side 134, and a DAC applies a variable voltage or current according to the digital signal from the microcontroller 210 to the light emitting side of an optical sensor.

The microcontroller 210 is additionally connected to the light detecting side of the optical sensors 130A–J. More precisely, referring to FIG. 4, the light detecting side 134 of each optical sensor includes a light-sensitive transistor (or photo transistor) 410, which is properly biased by various components such as resistors 420 and 430. The output voltage $V_{CE}$ of the transistor 410 generally decreases with the intensity light shining on the transistor 410. The output voltage is sensed by the analog-to-digital (A/D) port 440 of the microcontroller 210.

The microcontroller 210 is also connected to a memory module such as an electrically erasable programmable read-only memory (EEPROM) module 250, and can be linked to an external computer via an interface module 210 and the computer interface cable 116. The EEPROM 250 is used to store calibration data, explained more fully below, and other data such as scanner serial number and firmware version designation. The EEPROM 250 is also linked to and can be accessed by the DAC modules 220 and 230 and the interface module 260. The interface module can be of any suitable type, including those employing such well-known standards as RS-232 and USB.

The microcontroller 210 is also connected to a motor circuitry 240, which in turn drives the motor drive 118. The motor drive can include a stepper motor for positioning scan cards. Circuitry for driving stepper motors is well known.

The microcontroller 210 can be of any suitable type. Many are commercially available or custom built. One example is the Motorola MC68HC908GP32 microcontroller, available through numerous vendors for Motorola, Inc. This microcontroller can be operated at a frequency of 8 MHz. It has 32 kilobytes of on-chip FLASH memory with in-circuit programming capability, and has 512 bytes of on-chip RAM. It has a serial communication interface that is suitable for asynchronous serial communication and a serial peripheral interface suitable for synchronous high-speed communication. It also has an A/D port that has a resolution of 8 bits.

In the illustrative embodiment of the invention, operation and diagonostic software is stored in the on-chip FLASH memory, and the variable data for various calculations are stored in the on-chip RAM. The microcontroller can be set in a "monitor" mode, in which the software stored in the FLASH memory can be modified from the remote computer via the computer interface module. Alternatively, a programming pod, such as a Motorola M68SPGMR08 pod may be used to program the microcontroller 210.

Figure 3:
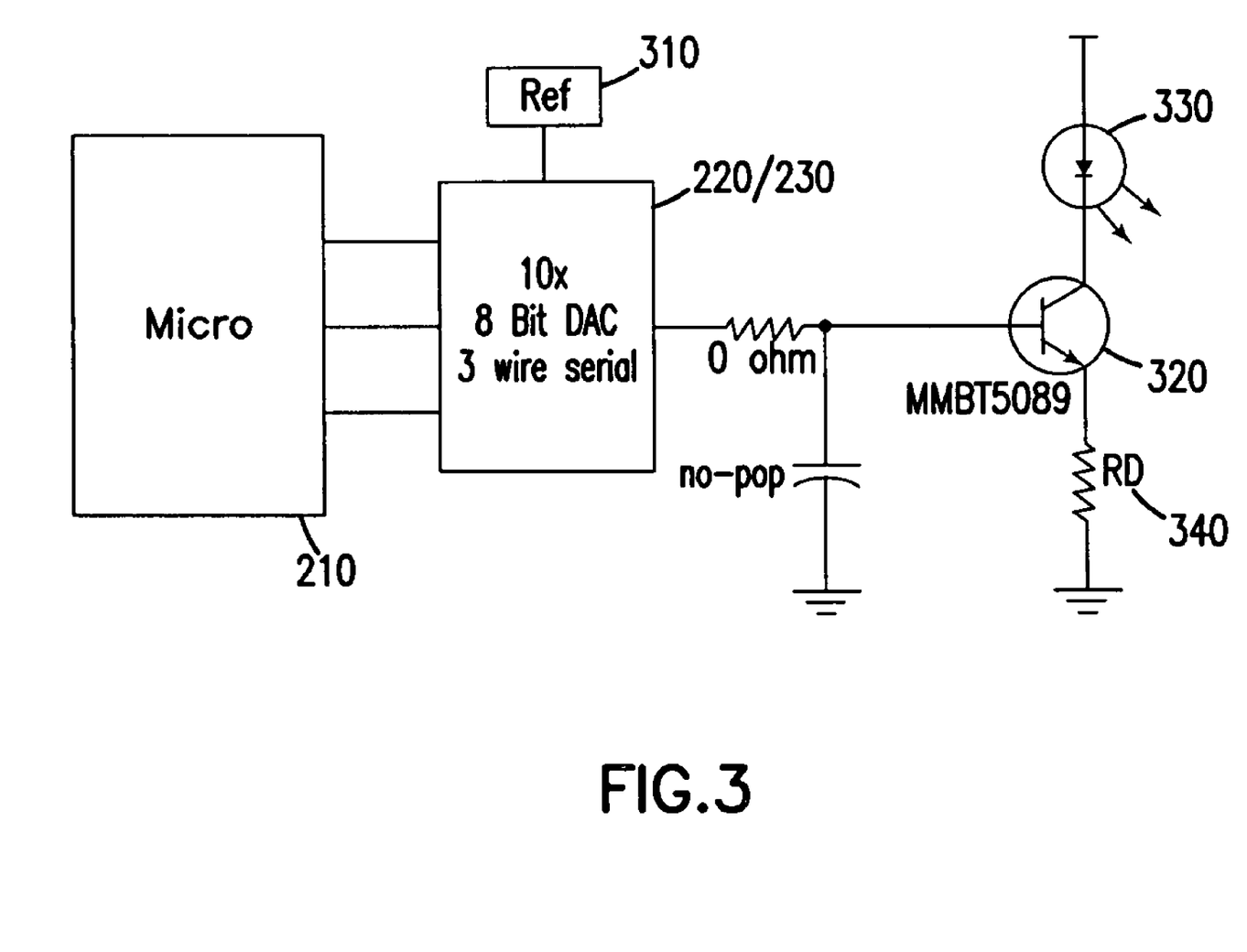
FIG. 3 schematically shows the details of the LED drive circuitry on the light emitting side of the optical sensors in FIG. 2.
Figure 4:
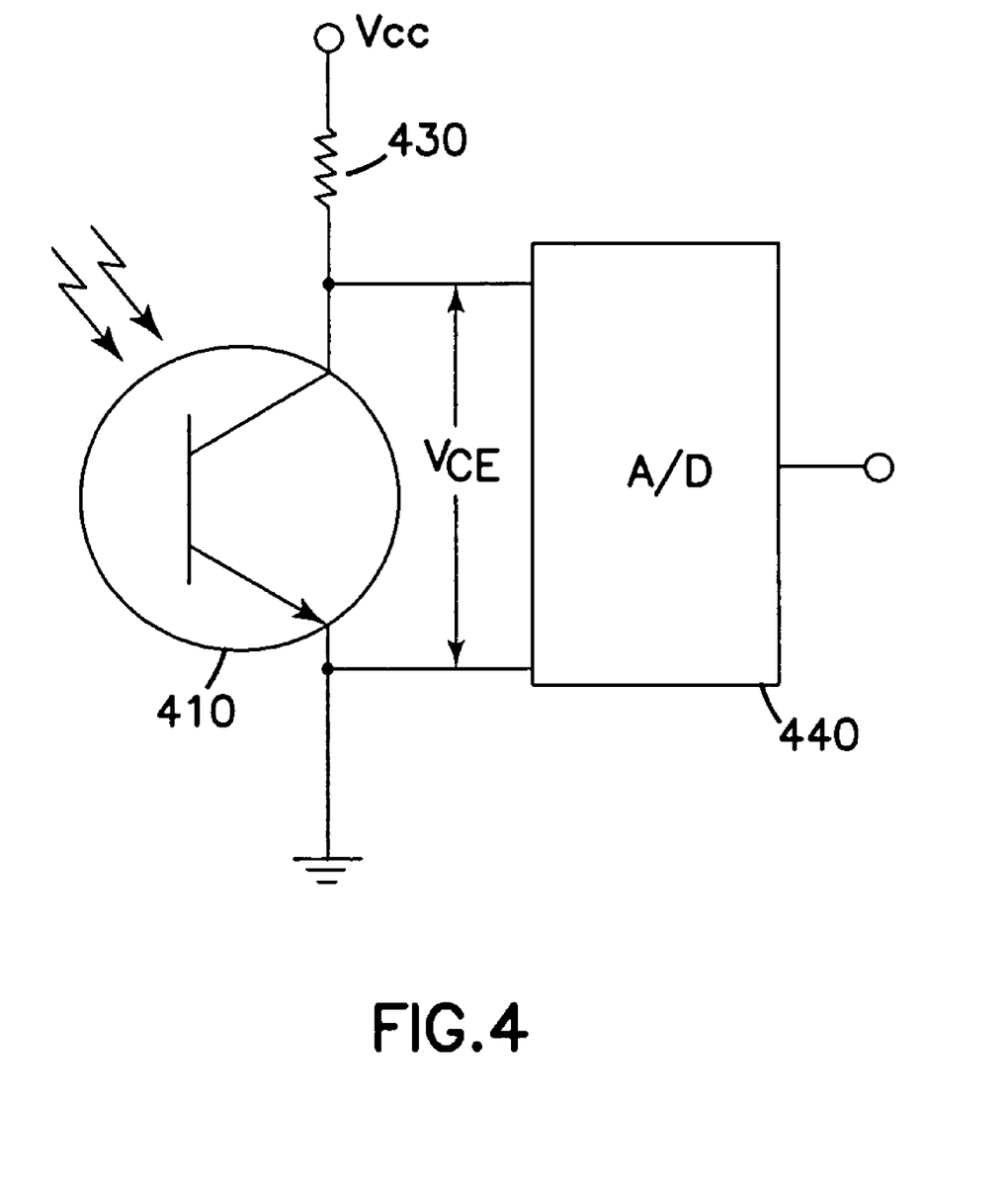
FIG. 4 schematically shows details of the photo detector circuitry on the light detecting side of the optical sensors in FIG. 2.

The optical sensors 130A–J are read one at a time using the A/D port 440 on the microcontroller 210 to detect the presence of blackened marks on scan cards. Many commercially available optical sensor packages can be used. For example, EE_SY 169 red LED photo sensor package, available from Omron Electronics, Schaumburg, Ill., can be used. Referring to FIG. 3, each sensor uses a red light-emitting diode (LED) 330 that shines directly onto the card. Using red light has the advantage that the sensors are "blind" to red marks and sensitive to a wide variety of marking instruments. Thus, various patterns, including instructions to the test takers, can be printed in red without interfering with the sensing operation. Less restrictions on the types of allowed marking instruments are also possible. In addition to the LED, there is also an photo-transistor 410 that is capable of detecting reflected light off the card. Therefore, if there is a white mark (or any mark that does not significantly absorb red), the phototransistor 410 will turn on and provide a low voltage value to the AID port 440. Also, if the phototransistor 410 detects a blackened mark, the voltage that appears on the A/D port 440 will indicate how much light is being reflected back depending on how dark the mark is. One optical sensor (e.g. 130A) can always be on to detect the presence of card insertion, and detects timing marks for each row that is scanned. The other nine optical-sensors are used to detect the presence of a blackened mark, and can be turned off to save power and reduce the current rating required of the power supply for the scanner.

Each of the optical sensors preferable operates in the most linear region of operation to output an appropriate voltage value from the blackened mark. In order to do so, the light output of the LED is adjusted. A DAC from module 220 or 230 is used to apply a different voltage, up to a reference voltage 310, to a bipolar-junction transistor (BJT) 320 that has the photo-sensor LED 330 in the collector and a 75-ohm resistor 340 in the emitter. The change in voltage across the resistor will vary the current through the LED 330, which current is proportional to the light output. Each of the ten photo-sensors is controlled by a different DAC in the illustrative embodiment although fewer DAC may be used in combination with one or more demultiplexers, which distribute the voltage supplied by the DACs to BJTs 320 in turn. Alternative forms of power controllers can be used to apply variable powers to the light emitters. For example, one of the resistors (such at load resister 340) can be a digit potentiometer that is controlled by the microcontroller 210 to control the operating condition of the BJT 320 so as to vary the current through the LED.

Each DAC is calibrated to provide the correct light output for each of the photo-sensors, as described below. This calibration voltage value will be stored in EEPROM 250.

Figure 5:
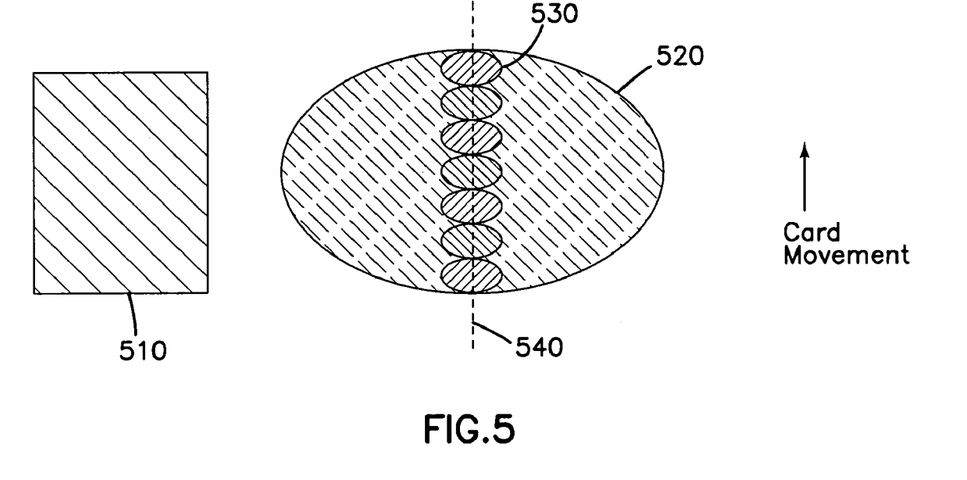
FIG. 5 schematically shows the relationship among a bubble, the timing mark for the bubble's row and the multiple reading locations.

In operation, software stored in the microcontroller instructs one of the optical sensors (e.g. 130A, called the timing sensor for the discussion) to be always on, and the remaining sensors (called "measuring sensors" for the discussion) turned on only when the timing sensor encounters a timing mark. Once the timing sensor encounters a timing mark, the measuring sensors continue to repeatedly take data until the timing sensor no longer detects the timing mark. Thus as schematically shown in FIG. 5, while the timing mark 510 of approximately the same height as a bubble 520 in the same row is detected by the timing sensor, the measuring sensor in the same column as the bubble 520 may be able to take multiple readings 530 of the reflectance or mark density of the bubble 520 along a scanning axis 540. The size of the optical spot for each reach 530 can be sufficiently large so that the successive readings spatially overlap each other to ensure that every point along the scan axis 540 is scanned.

The software can also determine the format of each inserted scan card by reading a preprinted row of marks at the leading end of the card. The method of encoding and retrieving format information, such as type of card, number of rows and number of columns for multiple-choice questions, is described in detail in the co-pending and commonly owned U.S. Application, entitled "Data Form for Optical Mark Reading Systems" and filed on Sep. 4, 2001 Ser. No. 09/946,800. The aforementioned co-pending application is hereby incorporated herein by reference.

Figure 6:
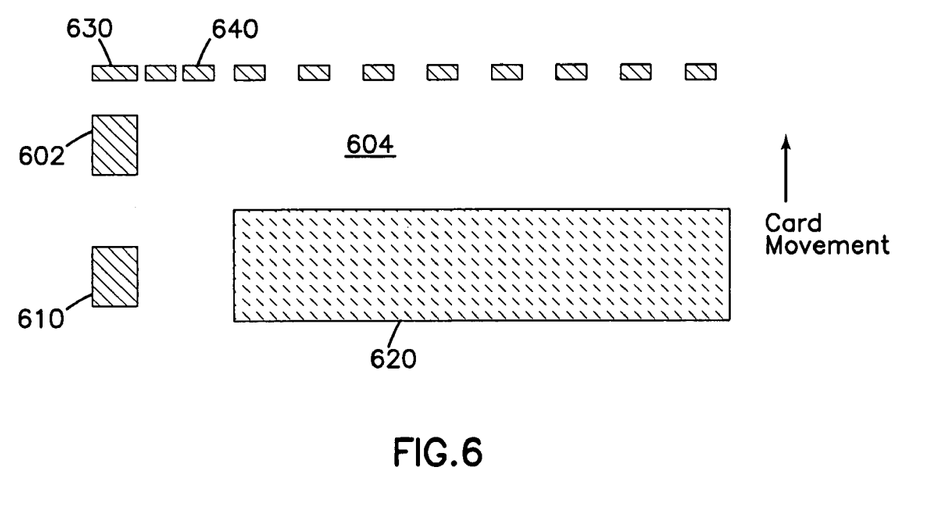
FIG. 6 schematically shows portions of a calibration card according to the invention, including the first row pattern.

As mentioned above, to accurately measure the reflectance or mark density of the marks, the OMR must first be calibrated. The calibration can be performed in two steps. See FIG. 8. The first (called "DAC calibration" for the discussion) is designed to bias all of the measuring sensors so that the optical transistors 410 are close to saturation when the sensors are scanning pure white. This way, the output voltage of each transistor 410 will be the most linear over a large range of surface reflectance. Referring to FIG. 6, which shows incomplete portions of a calibration card, to begin DAC calibration, a calibration card is inserted into the OMR. When the timing sensor detects the first timing mark 630, the measuring sensors begin scanning the first preprint row. When the first measuring sensor (130B) detects a dark bubble 640, the OMR proceeds into the calibration mode. In an illustrative alternative, the microcontroller 210 then instructs the motor drive 118 to reverse its rotation to back up the cars so that all sensors 130A–J are exposed to a background of known reflectance. For example, they can be all exposed to a pure white background. In an alternative illustrative embodiment, the card continues forward, and when the next timing mark 602 is encountered, at least some of the measuring sensors (for example 130C–J, i.e., the rightmost eight) begin sensing the brightness of their respective columns of known reflectance, for example pure white background 604. (810) In either case, the microcontroller 210 continues to adjust the output voltages of the DACs, and thus the intensities of the LEDs in the sensors, until the output of each sensor being calibrated is at a predetermined voltage, for example approximately one volt for the sensor package mentioned above (820). The digital values of the DACs at that point are then stored in the EEPROM, and the measuring sensors are biased with the stored voltage values from this point on.

Figure 8:
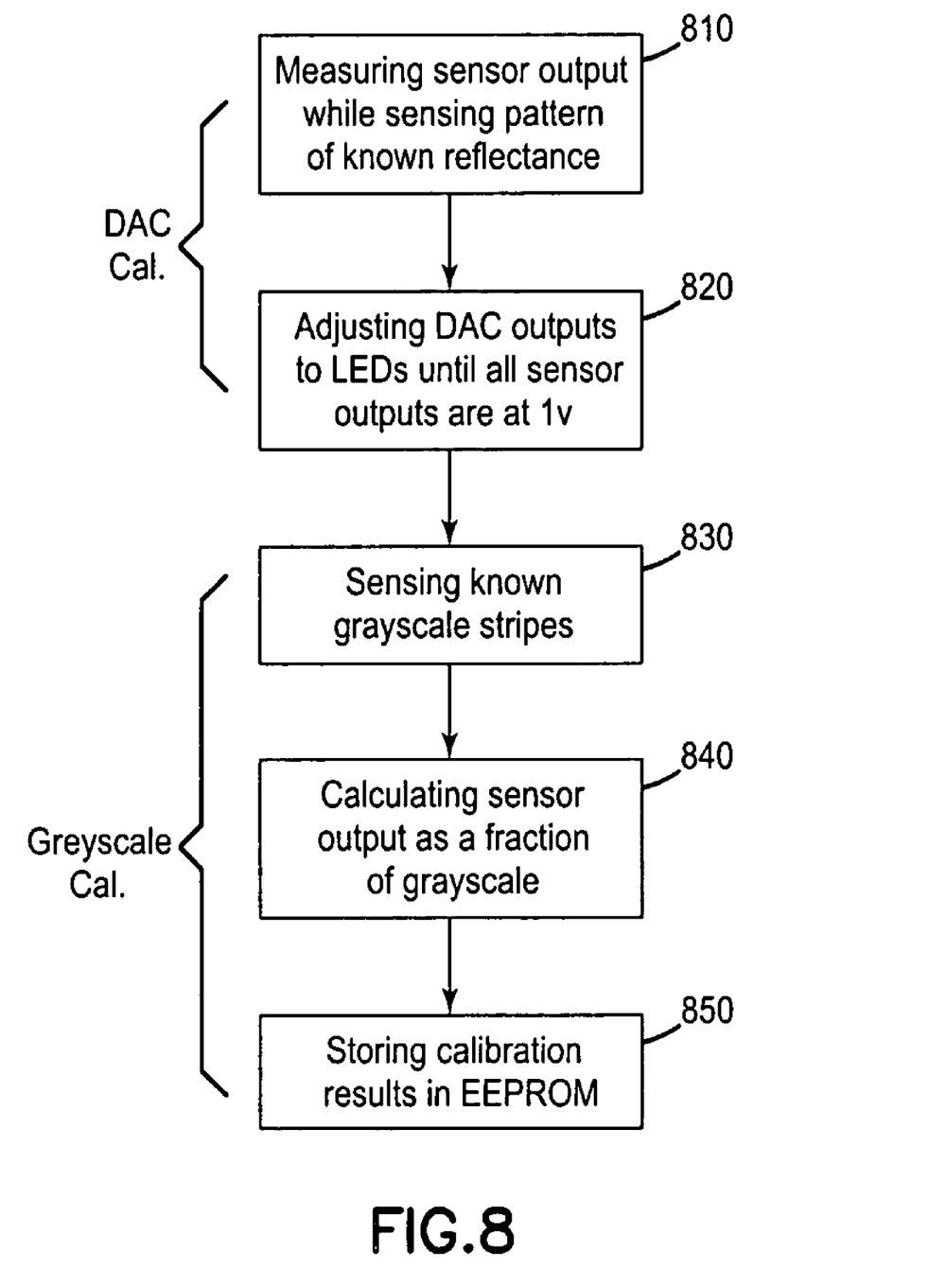
FIG. 8 outlines the method of calibrating an OMR according to one aspect of the invention.

In the Second step, "grayscale calibration", at least one mark of a known grayscale is scanned by the measuring sensors to determine their grayscale response (830). Continue to refer to FIG. 6, a stripe 620 is being scanned when the timing sensor runs over the timing mark 610. The stripe 620 is printed at a predetermined grayscale, for example 15% screened coverage. Each of the measuring sensors continues to generate a voltage from the reflected light. The voltage values, i.e., their digital representations (in the illustrative embodiment, a number between 0 and 255, inclusive) after the analog-to-digital conversion at the A/D port 440, are averaged by the microcontroller. The result is a voltage value corresponding to a known grayscale for each measuring sensor. Stripes of other grayscales, for example 10% and 25% can additionally be used to obtain further voltage-to-grayscale correspondence. The voltage values thus obtained are then stored in the EEPROM, to be read later during scanning.

Alternatively, more calibration points can be obtained from the measured voltage valued. Approximating the voltage-grayscale curve with a piece-wise linear one, the software in the microcontroller (or the remote computer) can easily calculate the voltage values corresponding to other grayscale values by linear interpolation and extrapolation using the closest measured points (840). For example, the voltage value for 12% grayscale can be obtained from the linear relationship between 10% and 15% grayscale. The calculated voltage values for different grayscale for each optical sensor are then stored in the EEPROM.

Experience has shown that for most applications, any density higher than 30% gray is a clear indication of intent to mark. Experience has also shown that differentiating grayscale between 0% and 30% gray by 16 intervals, i.e., approximately 2% steps, is sufficient in most applications. Thus, in the second alternative embodiment of the invention, sixteen voltage values can be stored (850) in the EEPROM for each sensor, corresponding to 16 levels of gray: Level "0" means pure white, while level 16 means 30% or darker, and is considered black.

Figure 10:
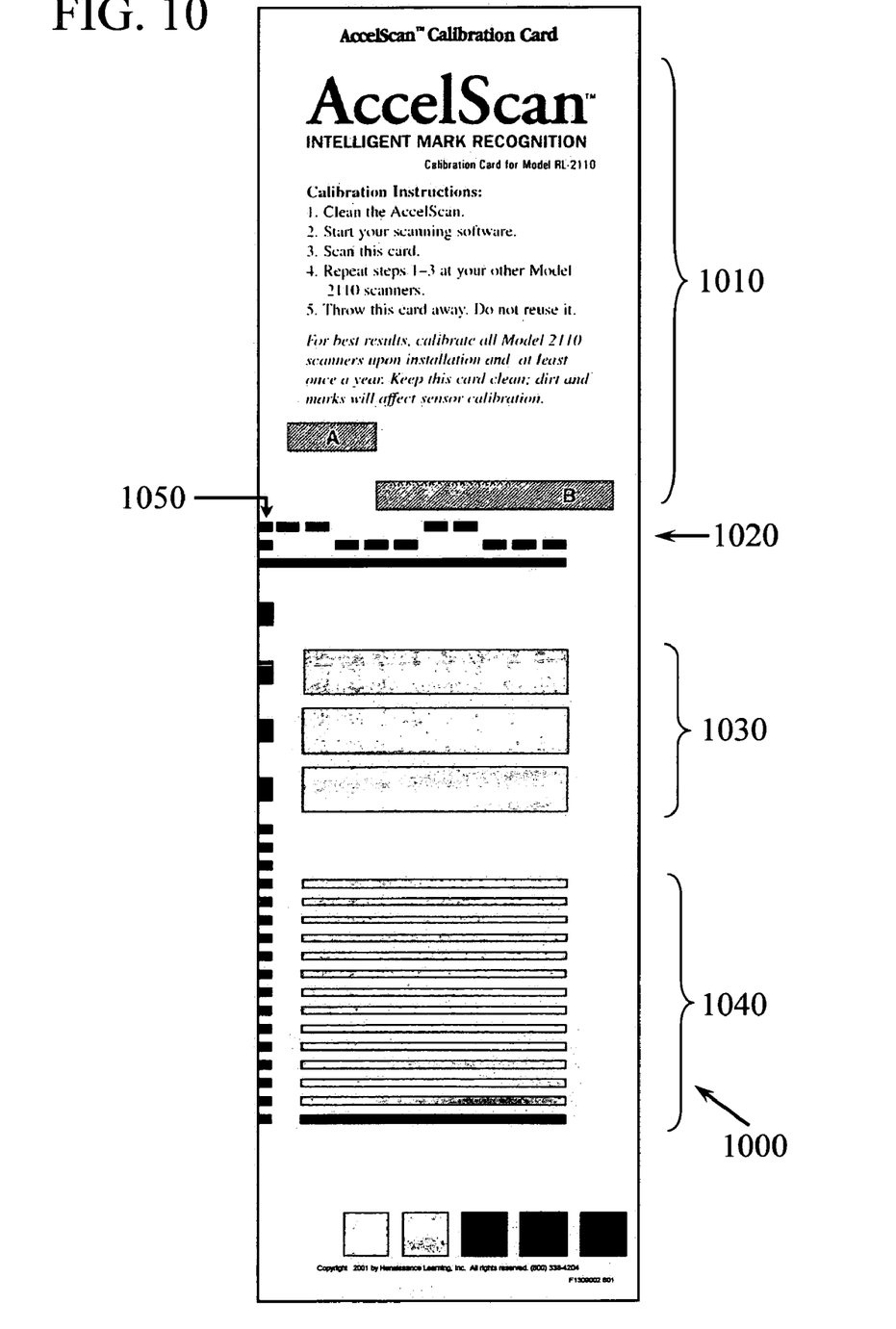
FIG. 10 illustrates a calibration card used to carry out the calibration process according to one aspect of the invention.

FIG. 10 illustrate a calibration card 1000 that can be used to carry out the calibration steps outlined above. The card has a first portion 1020 that is "white" the sensors. That is, the areas to be scanned in this portion is either white or printed with red ink that is indistinguishable from white to the red sensors. A row 1020 of pre-printed marks begins the scanning process and indicates to the scanner the presence of a scan card. Next a series of stripes 1030 of varying known reflectance is positioned for grayscale calibration, as described above. Further patterns, such as grayscale bars 1040 of know reflectance, can be used to enable the controller 210 or the remote computer to verify the grayscale calibration.

Both steps of calibration can be performed either in factory or by end users on site, although experience has shown that with the OMR of the illustrative embodiment, more than one DAC scan is rarely necessary. The ability to quickly calibrate the scanner in the field has the advantage that any change in the characteristics of the scanner due to certain factors can be conveniently compensated. These factors include mechanical damage, such as scratch, to the optical sensors or their cover; aging of the electronic and optical components; and degradation of the components due to extreme temperatures that the scanner has been subjected to.

Figure 9:
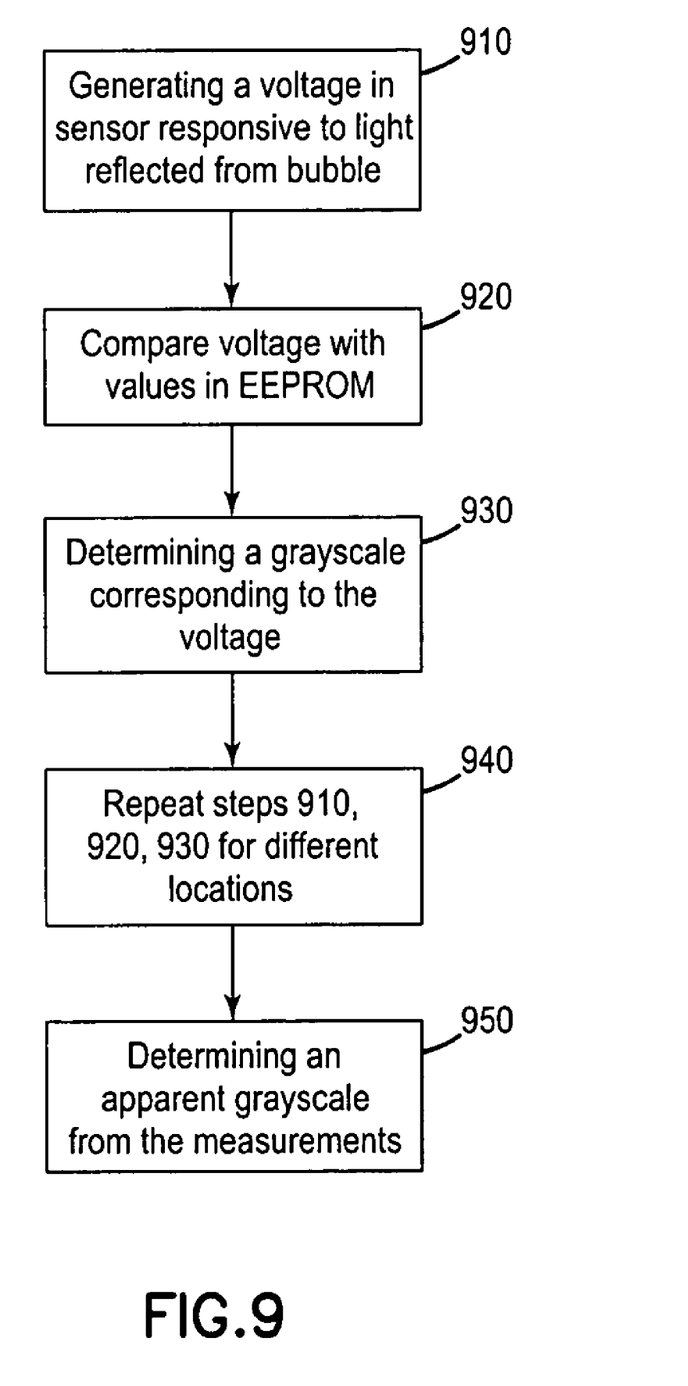
FIG. 9 outlines the method of determining the grayscale of a mark according to one aspect of the invention.

In routine operation, FIG. 9, each measuring sensor generates (910) a voltage signal responsive to the detected light reflected from a bubble while the timing sensor is sensing the timing mark in the same row. In the case where the number of reflectance levels to be determined (e.g., sixteen) is greater than the number of stored calibration points (e.g. three: 10%, 15% and 25%), a linear extrapolation or interpretation process similar to the one outlined about for the grayscale calibration can be used to determine the reflectance, or grayscale. Thus, for a measured voltage value falling between those for 10% and 15% reflectance, for example, the corresponding reflectance can easily be solved by the linear voltage-reflectance equation between 10% and 15% reflectance. Alternatively, if the number of reflectance levels to be determined (e.g., sixteen) is the same as the number of stored calibration points, the microcontroller 210 simply compares (920) the measured voltage value to those stored in the EEPROM for the sensor and picks (930) the grayscale corresponding to the stored valued closest to the measured one.

As data for the same bubble is repeatedly read at different locations (940) and afterwards (i.e., when the timing mark ends), the microcontroller 210 can perform a variety of functions depending on how it is programmed. For example, the microcontroller 210 can ignore the first two or any number of measurements after the timing mark is encountered by the timing sensor because the measuring sensors may not have stabilized after first being turned on; the microcontroller 210 can keep track of the peak voltage value or a running average of a group of measurements for a bubble.

After the measurements for a bubble is completed, the microcontroller 210 can send several possible numbers as a measure of apparent grayscale (950) to the remote computer through the computer interface 260 for further processing. For example, the peak grayscale level can be sent; the average grayscale level can be sent; a predetermined combination of the average and peak can also be sent. A return of grayscale level other than black or white may be very useful. For example, some test takers may normally write very lightly. Thus for those people, bubble filled with 15% gray may indicate an intent to mark. The remote computer, for example, can be programmed to analyze the pattern of a test taker. If the majority of marked bubbles are marked lightly by a test taker, the computer may accept a lower mark density threshold as indication of affirmative making for that particular test taker. More complex on-chip calculations can be performed to achieve more sophisticated results, as the following example demonstrates.

Figure 7A:
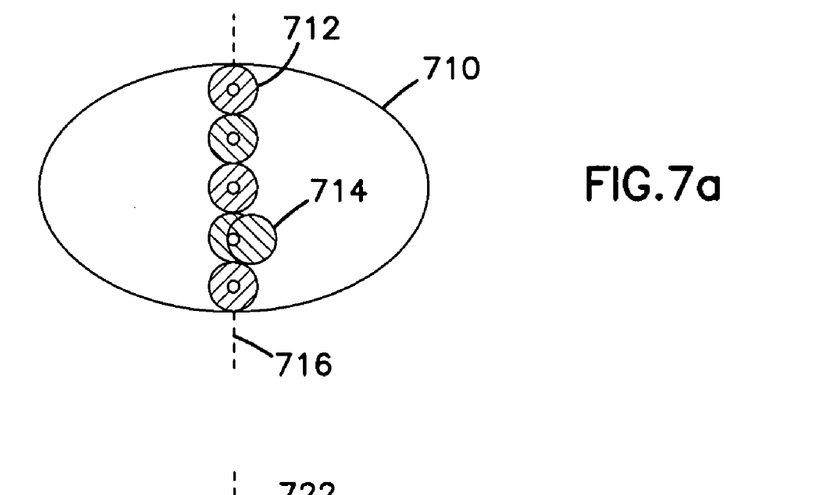
Figure 7B:
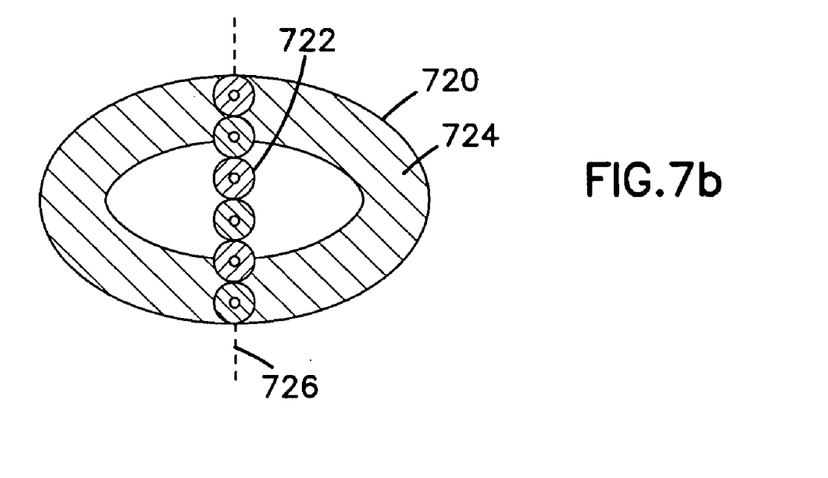
Figure 7C:
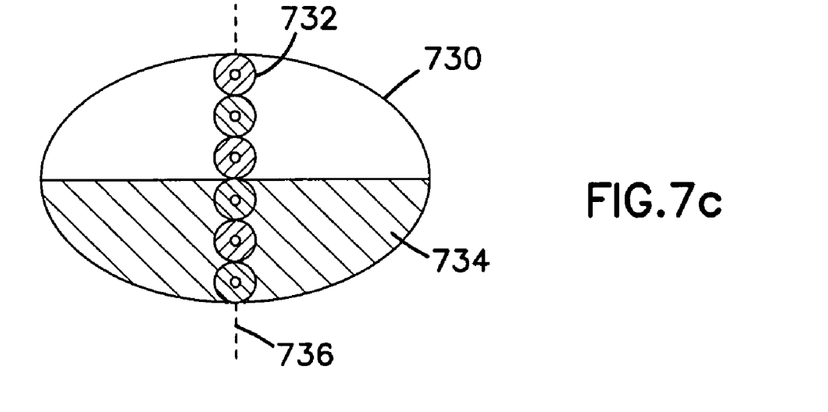

In many cases, neither peak value nor average value gives satisfactory determination of intent. For example, referring to FIG. 6(a), an accidental dark fleck 714 in a bubble 710 may be judged as a mark if peak value is used. If the average is used, an incomplete coverage 724 and 734, although unquestionably intended mark, as shown in FIGS. 7(b) and (c), may be judged a blank or questionable.

To address such situations, in one embodiment, the microcontroller 210 is programmed to perform an algorithm such that if the difference between the peak and average is smaller than a predetermined percentage (e.g. 75%) of the peak, the microcontroller 210 sends the peak grayscale level to the remote computer; otherwise the average is sent. For example, assume that the predetermined percentage is set at 75% and the microcontroller collects eight data points for each bubble. In the case of a fleck shown in FIG. 7(a), the peak would be 16 and average would be 2 (one detection of a mark out of eight). Because the difference is 14, greater than 75% of 16, the microcontroller 210 sends to the remote computer a 2, indicating a very low confidence of marking. For situations in FIGS. 7(b) and (c), in contrast, similar calculations lead to differences of less than 75% of peak (e.g., 50% for 50% coverage). The microcontroller 210 will therefore send a peak value of 16, a strong indication of intent to mark.

In one embodiment of the invention, the predetermined percentage can be set in the software in the microcontroller 210 from the remote computer and changed as application demands.

Thus, the device and method according the invention introduce more tolerance by an OMR to different marking behaviors test takers, voters and the like and enable a more accurate assessment of the true intent of a person marking the scan card. The invention also makes possible highly automated calibration of an OMR.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An optical mark reader, comprising:
   a. a plurality of light sources, each configured and arranged to illuminate an area of a surface, the illuminated area having a reflectance;
   b. a plurality of light detectors, each configured and arranged to receive at least a portion of any light reflected by the surface from a respective one of the plurality of light sources and output a signal indicative of the intensity of the received light;
   c. a controller operatively connected to the plurality of detectors and configured and arranged to receive the signals output from the plurality of detectors; and
   d. a plurality of power sources, each power source operatively connected to one of the plurality of light sources and operatively connected to the controller, and configured and arranged to supply power to the light source in response to signals from the controller, wherein the controller is configured and arranged to generate, responsive to the output of each of the plurality of detectors, a signal indicative of the reflectance of the respective illuminated area.

2. The optical mark reader of claim 1, further comprising a memory device operatively connected to the controller, wherein the controller is configured and arranged to read information from, and write information to, the memory device, wherein the memory device is encoded with calibration information, wherein the controller is configured and arranged to generate the signal indicative of the reflectance of the respective illuminated area in further response to the calibration information.

3. The optical mark reader of claim 2, wherein the controller is switchable to a calibration mode, in which mode the controller is configured and arranged to generate, responsive to the signals output from each of the plurality of detectors, a control signal that alters the power output of the power source to the light source connected to the power source until the signal output from the detector reaches a predetermined level when the respective illuminated area has a first predetermined reflectance, and to store a code indicative of the final control signal in the memory device.

4. The optical mark reader of claim 3, wherein the controller is configured and arranged to derive calibration information based at least partially on the signals output from each of the detector receiving reflected light from an area with a second predetermined reflectance, and encode the memory device with calibration information.

5. The optical mark reader of claim 1, wherein the plurality of light sources are light-emitting diodes and the power sources are configured and arranged to receive digital signals from the controller and supply power to the light-emitting diodes according to the digital signals received from the controller.

6. The optical mark reader of claim 5, wherein the power sources are digital-to-analog converters, with the analog side configured and arranged to power the light-emitting diodes, and the digital side configured and arranged to receive digital signals from the controller.

7. The optical mark reader of claim 1, further comprising a computer interface module between the controller and a computer, wherein the controller is configured and arranged to transmit data to, and receive data from, the computer through the computer interface.

8. The optical mark reader of claim 7, wherein the controller comprises a memory area for storing program and is configured and arranged to receive programs from the computer through the computer interface.

9. A method of calibrating an optical mark reader, the method comprising:
  a. illuminating a surface area having a predetermined reflectance using a light emitter of the optical mark reader, wherein the light emitter is one of a plurality of light emitters in an array;
  b. receiving at least a portion of any light reflected by the surface area using a light detector of the optical mark reader, wherein the light detector is one of a plurality of light detectors in an array;
  c. measuring a signal generated by the light detector responsive to the received light; and
  d. electronically adjusting a power source connected to the light emitter to vary the intensity of the illumination by the light emitter until the signal measured in step (c) becomes a predetermined value, wherein the power source is one of a plurality of power sources, and each power source is connected to a single light emitter.

10. The method of claim 9, wherein step (d) includes supplying power to the light emitter using a power controller that is configured and arranged to supply power to the light emitter in response to a digital signal and applying a variable digital signal applied to the power controller.

11. The method of claim 10, wherein step of supplying power includes supplying power to the light emitter using a digital-to-analog converter.

12. The method of claim 9, further comprising
  e. illuminating a surface area of a second reflectance using the light emitter;
  f. receiving at least a portion of the light reflected by the surface area from the light emitter;
  g. generating a signal indicative of the intensity of the light received by the light receiver;
  h. calculating one or more calibration factors based on the signal.

13. A method of inspecting a bubble on a scan card, the method comprising:
  a. measuring the darkness of the surface within the bubble at a plurality of locations;
  b. recording the peak darkness among the measurements;
  c. calculating the average of all darkness measured at the plurality of locations;
  d. generating a signal as a function of the peak darkness and the average.

14. The method of claim 13, wherein step (d) includes generating a signal indicative of the peak darkness if the difference between the peak darkness and the average is smaller than a predetermined percentage of the peak darkness, and generating a signal indicative of the average if the difference is not smaller than the predetermined percentage.

* * * * *

UNITED STATES PATENT AND TRADEMARK OFFICE
CERTIFICATE OF CORRECTION

PATENT NO. : 7,068,861 B2
APPLICATION NO. : 09/946797
DATED : June 27, 2006
INVENTOR(S) : Swanson et al.

Page 1 of 1

It is certified that error appears in the above-identified patent and that said Letters Patent is hereby corrected as shown below:

Col. 4, line 56: "Referring to FIGS 1(*a*)-(*d*)," should start a new paragraph

Col. 6, line 41: "to the AID port 440." should read --to the A/D port 440.--

Signed and Sealed this

Twenty-ninth Day of May, 2007

JON W. DUDAS
*Director of the United States Patent and Trademark Office*